N. J. OLSSON.
AUTOMATICALLY OPERATING DEVICE FOR CUTTING OFF THE FEED MOTION OF MACHINE TOOLS.
APPLICATION FILED JULY 22, 1919.

1,436,674. Patented Nov. 28, 1922.

INVENTOR:
Nils Josef Olsson,
By Attorneys,

N. J. OLSSON.
AUTOMATICALLY OPERATING DEVICE FOR CUTTING OFF THE FEED MOTION OF MACHINE TOOLS.
APPLICATION FILED JULY 22, 1919.
1,436,674.
Patented Nov. 28, 1922.
2 SHEETS—SHEET 2.
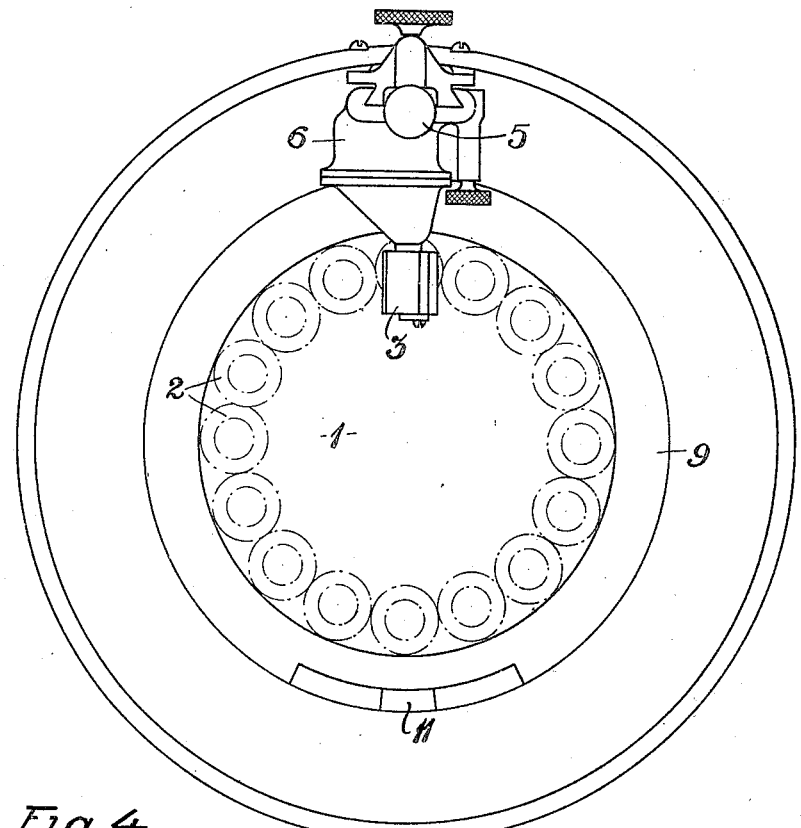
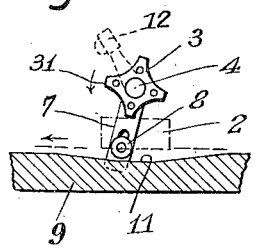
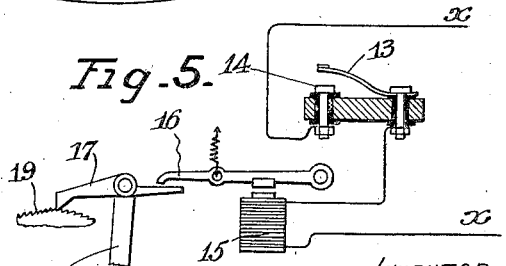
INVENTOR:
Nils Josef Olsson Patented Nov. 28, 1922.

1,436,674

UNITED STATES PATENT OFFICE.

NILS JOSEF OLSSON, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

AUTOMATICALLY-OPERATING DEVICE FOR CUTTING OFF THE FEED MOTION OF MACHINE TOOLS.

Application filed July 22, 1919. Serial No. 312,646.

*To all whom it may concern:*

Be it known that I, NILS JOSEF OLSSON, a subject of the King of Sweden, residing at Gottenborg, in the Kingdom of Sweden, have invented new and useful Improved Automatically-Operating Devices for Cutting Off the Feed Motion of Machine Tools, of which the following is a specification.

In the copending patent application Serial No. 241,392, filed June 22, 1918 (patented Aug. 10, 1920, No. 1,349,222) an automatically acting device for cutting off the feed motion of grinding machines and the like is described in which a pivotally mounted lever or a similar feeling means bears upon the work or upon a member bearing, in turn, upon the work, the lever being so arranged and so formed at the contact point that, when the desired size of the work has been reached, the lever will under the action of a spring, a weight or the like be brought out of engagement with the work or with the said member and caused to cut off the feed motion.

The device above referred to has the disadvantage that the member engaging with the work will be gradually worn so that adjustments thereof are necessary for maintaining a due operation of the device. The improvement forming the object of this invention has for its purpose to decrease said wear to a minimum amount so that the device may maintain an exact action during a longer time, the said improvement consisting in the combination with the feeler engaging with the work of a guiding device maintaining the feeler out of contact with the work during part of each revolution, the time for engagement of the said feeler with the work being thereby reduced which results in a corresponding reduction of the wear of the feeler.

The invention is illustrated in the accompanying drawing which shows the application of the invention in a machine for grinding flat surfaces of ball bearing rings. Fig. 1 shows one half of a vertical central section of the grinding table with the devices belonging thereto. Fig. 2 shows an elevation of said device, part thereof being shown in section. Fig. 3 shows a top plan view of the device.

Fig. 4 is a fragmentary view showing certain of the parts in elevation and the cam portion of the guideway in section;

Fig. 5 is a diagrammatic view showing the circuit-closing contacts and an illustration of a feed stopping means.

Figure 1:
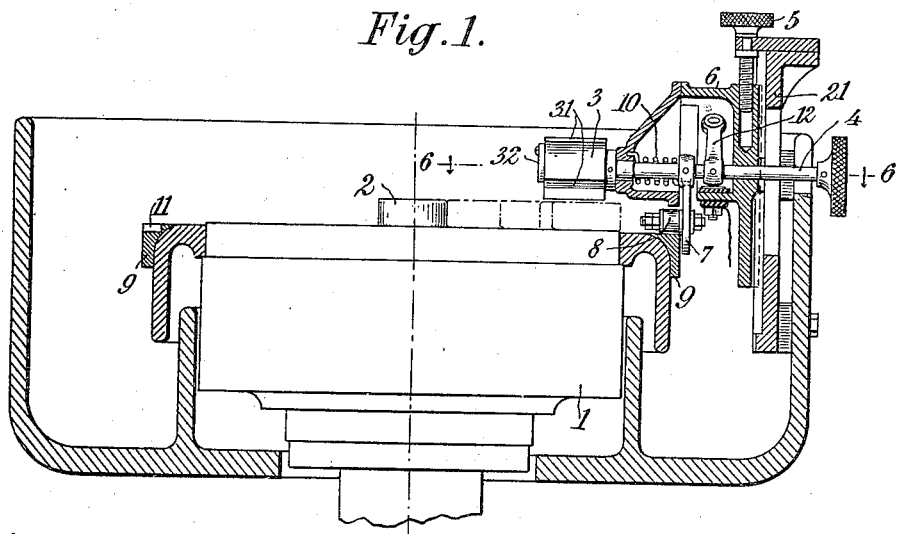
Figure 7:
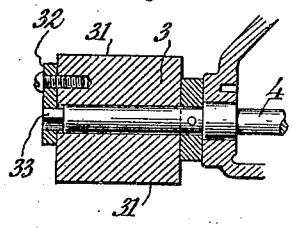
Fig. 7 is an enlarged fragment of Fig. 1 in section on the same plane, showing the testing lever or disk 3 in section.
Figure 6:
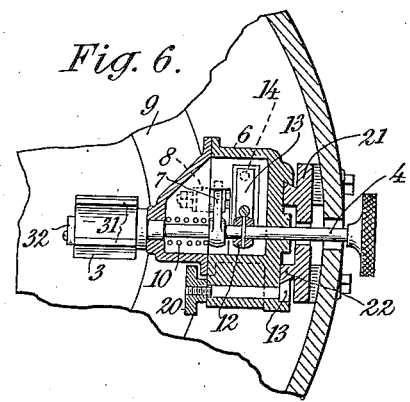
Fig. 6 is a fragmentary horizontal section in the plane of the line 6—6 in Fig. 1.

Referring to the drawing, 1 indicates a rotary circular grinding table on which the work or work pieces, in the present case ball bearing rings 2, is or are placed in a circle and held in place in any suitable manner, for instance by magnetic attraction. The grinding operation is performed by means of one or more grinding disks placed above the grinding table eccentrically with respect thereto, said disks, however, being not shown in the drawing. Said grinding disks work upon the upper flat surfaces of the rings 1, until the latter reach the thickness desired. To automatically stop the machine or cut off the feed motion thereof so as to cause the grinding operation to cease as soon as the desired dimension of the rings is reached, the following arrangement is provided.

Figure 2:
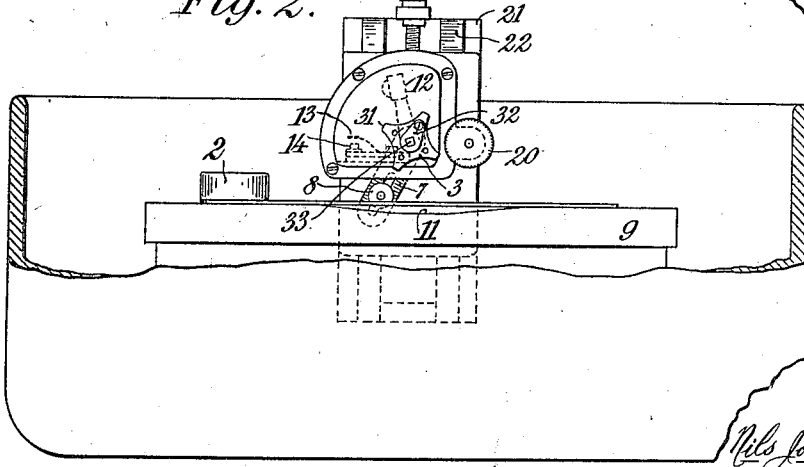

Engaging with the upper side of the ball bearing rings is a feeling device in the nature of a lever being shown as a disk 3 formed with projections 31 which may be of equal length or of varying lengths according to the requirements of the work. Said disk is fixed on a horizontal shaft 4 mounted in a support 6 which may be adjusted in the vertical direction by means of a screw 5. A clamp 23, drawn up by a nut 20, may lock fast the support 6 after adjustment. Fixed on the shaft 4 is also an arm 7 carrying at its free end a roller 8 engaging a circular guide-way 9 formed at the circumference of the grinding table. A spring 10 on the shaft 4 tends to turn the shaft in such a direction as to maintain the roller in contact with said guide-way 9. Said guide-way has a flat level top for the greater part of the circumference of the table the guide-way being for the remaining part of the circumference formed with a recess 11 (Figs. 2 and 3) having such a depth as to permit the arm 7 with the roller 8 to swing through in the direction of the arrow shown in Fig. 2 provided there is otherwise no hindrance against such a movement.

The shaft 4 further carries an arm 12 adapted to operate a contact spring 13 cooperating with a fixed contact piece 14 mounted below the said spring. The contact members 13, 14 are adapted to be connected (as shown in Fig. 5) in the circuit of a device for cutting off the feed motion of the grinding machine which device may be of any desired appropriate type and which is, therefore, not shown in detail, but may include an electro-magnet 15 which when energized operates the stop device.

The operation of the device described is as follows:

When the grinding operation is taking place and the work has not yet reached the size desired the feeling disk 3 and the arm 7 cooperate in such a way that the arm 7, as long as its roller bears upon the higher flat portion of the guide-way 9, maintains the feeling disk 3 out of contact with the work while, on the contrary, when the recess 11 comes under the roller 8, it ceases to uphold the roller, and the shaft turns until the projection 31 of the disk 3 which is in operation at that time comes into contact with the work, as shown in Fig. 4, thereby preventing further movement of the shaft 4. As soon as the recess 11 has passed the roller 8 this is again moved upwards thereby bringing the projection 31 of the feeling disk out of contact with the work. As long as the work has not reached the size desired said operation is repeated once for each revolution of the grinding table and whenever the feeling disk engages the work a test of the extent of the grinding operation is made. As soon as the size desired is reached, the projection 31 of the disk 3, however, cannot prevent the rotation of the shaft 4, when the recess 11 comes beneath the roller 8, but the projection 31 will pass by the work simultaneously that the roller 8 passes the lowermost point of the recess 11, so that the projection 31 swings through an arc past the vertical, so that the shaft 4 turns under the action of the spring 10 until the arm 12 strikes the contact spring 13, and causes it to engage the contact piece 14 thus immediately cutting off the feed motion of the machine. As an illustration of one means by which the feed motion may be cut off, there is shown in Fig. 5 the wires $x$ forming part of an electric circuit making connection with the contacts 13, 14, respectively, and including the winding of the electro-magnet 15, which when energized attracts its armature, so that the lever 16 thereof strikes the tail of a gravity or spring pawl 17 carried by a vibrating arm 18, and lifts the nose of this pawl out of the teeth of the feed ratchet 19, thus stopping the feed. So far as concerns the present invention, any other known means of stopping the grinding operation may be used.

The disk 3 is shown as having four arms or projections 31, and may be turned on the shaft 4 to bring either of these into action. For this purpose any suitable means may be provided, that shown comprising a piece 32 having a square hole engaging a squared end 33 on the shaft 4, and fastened by a screw to the disk 3.

Having thus described my invention, what I claim is:—

1. In a device for automatically controlling the feed of a machine tool, the combination of a movable work holder, a guide moving therewith having a recess, a movable part adapted to bear on said guide, a feeler connected to said part and having a testing portion adapted to touch the work only when said part enters into said recess and feed controlling means connected to the said feeler and adapted to be governed thereby, whereby when the work has been reduced to a predetermined dimension the consequent movement of the feeler operates the feed-controlling means to discontinue the feed.

2. In a device for automatically controlling the feed of a machine tool, the combination of a movable work holder, a guide moving therewith having a recess, a swinging arm having a part adapted to rest on the said guide and to enter said recess, a feeler connected to said arm and having a testing portion adapted to touch the work when the said part enters such recess, and feed controlling means connected to said feeler and adapted to be governed thereby, whereby, when the work has been reduced to such extent as to allow the feeler to move to a predetermined position, upon said part entering said recess the feed is discontinued.

3. In a device for automatically controlling the feed of a machine tool, the combination of a movable work holder, a guide moving therewith, and having a recess, a movable part engaging said guide and adapted to enter said recess, a feeler mounted upon a pivotal axis and having a testing portion adapted to touch the work and connected to said part so that it is lifted out of contact with the work except when said part enters said recess, the said part adapted, when the work has been reduced to the radius of said testing portion, to execute a swinging movement upon the said part entering said recess, and a feed controlling means adapted to be operated by said movement to stop the feed.

4. In a device for controlling the feed of a machine tool, the combination of a movable work holder, a guide moving therewith having a recess, an arm having a part engaging said guide and adapted to enter said recess, a shaft carrying said arm, a feeler mounted on said shaft and having a projecting testing portion adapted, when said part enters said recess, to move into contact with the work, a spring actuating said arm and feeler, and a feed controlling means adapted, when the feeler engages the work, and is no longer restrained thereby, to stop the feed.

5. A feed controlling device according to claim 1, the feed controlling means including an electric circuit and circuit closing contacts adapted to be operated by said feeler.

In testimony whereof I have signed my name.

NILS JOSEF OLSSON.